US005406031A

United States Patent [19]

Mathieu et al.

[11] Patent Number: 5,406,031

[45] Date of Patent: Apr. 11, 1995

[54] ELECTRICAL COMPONENT

[75] Inventors: Gerard Mathieu, Pontoise; Frederic F. Passa, Brueil en Vexin, both of France; David Lodge, Cirencester, England

[73] Assignee: Raychem S.A., France

[21] Appl. No.: 185,862

[22] PCT Filed: Jul. 30, 1992

[86] PCT No.: PCT/GB92/01408

§ 371 Date: May 6, 1994

§ 102(e) Date: May 6, 1994

[87] PCT Pub. No.: WO93/03510

PCT Pub. Date: Feb. 18, 1993

[30] Foreign Application Priority Data

Jul. 31, 1991 [GB] United Kingdom ................. 9116523

[51] Int. Cl.[6] .............................................. H02G 15/08

[52] U.S. Cl. .................................... 174/84 R; 29/854; 174/DIG. 8; 403/28; 428/34.9

[58] Field of Search ................. 174/84 R, 87, DIG. 8; 29/854; 403/28, 271, 272, 273; 428/913, 34.9, 35.7; 439/932

[56] References Cited

U.S. PATENT DOCUMENTS

| | | | |
|---|---|---|---|
| 3,422,212 | 1/1969 | Clark | 174/84 R |
| 3,525,799 | 8/1970 | Ellis | 174/84 R |
| 3,925,596 | 12/1975 | Siden | 174/68.5 |
| 4,264,780 | 4/1981 | Rolland | 174/84 R |
| 4,405,421 | 3/1985 | Gen et al. | 228/224 |
| 4,722,471 | 2/1988 | Gray et al. | 228/265 |
| 4,736,070 | 4/1988 | Girard | 174/84 R |
| 4,883,925 | 11/1989 | Graf | 174/84 R |
| 4,940,179 | 7/1990 | Soni | 174/84 R |
| 5,194,692 | 3/1993 | Gallusser et al. | 174/36 |
| 5,221,815 | 6/1993 | Bostock et al. | 174/84 R |
| 5,286,921 | 2/1994 | Fontaine et al. | 174/84 R |

FOREIGN PATENT DOCUMENTS

| | | |
|---|---|---|
| 0044068 | 1/1982 | European Pat. Off. . |
| 0076681 | 4/1983 | European Pat. Off. . |
| 0270283 | 8/1992 | European Pat. Off. . |
| 1184186 | 3/1970 | United Kingdom . |
| 1334969 | 10/1973 | United Kingdom . |
| 1493322 | 11/1977 | United Kingdom . |
| WO88/09068 | 11/1988 | WIPO . |

*Primary Examiner*—Morris H. Nimmo
*Attorney, Agent, or Firm*—Sheri M. Novack; Herbert G. Burkard

[57] ABSTRACT

An electrical component has a body (1) and a plurality of leads extending from the body, and is enclosed in an insulating plastics sleeve (4) that extends over the body and leads. The sleeve (4) has a number of heat-recoverable end portions (6, 7) that extend over the leads and enclose a quantity of solder (8, 9), so that the leads can be permanently connected to further terminals by heating the end portions of the sleeves to cause them to recover and the solder to fuse.

9 Claims, 2 Drawing Sheets

ELECTRICAL COMPONENT

Figure 1:
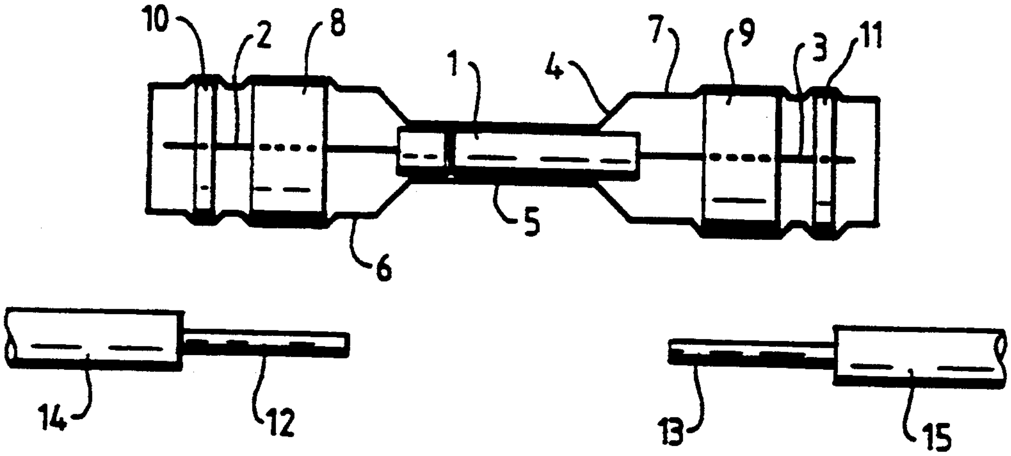

This invention relates to electrical components and to their connection and protection from the environment.

In certain instances, for example in automotive applications, where the component will be subject to hostile environments the component will need to be protected from the environment during use in addition to being connected to the appropriate terminals According to the present invention, there is provided an electrical component that has a plurality of leads extending therefrom, wherein the component is enclosed in an insulating plastics sleeve, and wherein the sleeve has a plurality of dimensionally heat-recoverable end portions that extend over the leads and each end portion encloses a quantity of solder so that each lead can be permanently connected to a conductor by heating the end portions of the sleeve to cause them to recover and the solder to fuse.

Although in the broadest aspect of the invention only the end portions of the sleeve need be heat-recoverable in practice it will be most convenient to employ a heat-recoverable sleeve and recover the central portion thereof into engagement with the component.

Heat-recoverable articles are now widely used in many areas where insulation, sealing and encapsulation are required. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

Any material to which the property of dimensional recoverability may be imported can, be used to form the heat-recoverable sleeve. For example, the sleeve may be formed from a polyolefin, eg. a low, medium or high density polyethylene, an ethylene copolymer, eg. ethylene vinyl acetate, a polyamide, eg. nylon 6 or nylon 11 or 12, or a halogen-containing polymer, especially a Fluoropolymer, eg. polyvinylidene fluoride, ethylene-tetrafluoroethylene copolymer or polytetrafluoroethylene. For most applications the preferred polymer for forming the recoverable sleeve will be polyvinylidene fluoride.

Preferably the sleeve includes a quantity of a fusible plastics material in each end portion that will seal the end portions of the sleeve against ingress of moisture after recovery of the sleeve. The fusible insert may be formed from the same polymer as the sleeve or a different polymer may be employed, normally having a somewhat lower softening point than that of the sleeve. For example, in the case of sleeves made from polyvinylidine fluoride a fusible insert formed from a polyolefin may be employed.

The component according to the invention has the advantage that it is relatively easy to install, simply requiting a quantity of heat to form the electrical connection between the component leads and the terminals to be connected, and to encapsulate and seal the connections.

The component may, instead, be one that has three or more leads. For example, a transistor, a multi-contact electrical connector or a multi-contact switch. However many leads the component has, in certain designs of component the leads may extend from one side of the component. In this case the sleeve may comprise a plurality of tubular portions each of which extends over one of the leads, and a further sleeve portion that extends over the body of the component, one end of the tubular portions being retained in the further sleeve portion, for example by partial recovery of part of the further sleeve portion over the ends of the tubular portions.

The component according to the invention may comprise any of a number of electrical components for example capacitors, resistors, diodes or two lead circuit protection devices, for example those based on autotherming carbon loaded polymers, and normally the component will be a dual-in-line (D.I.L) component although it is possible for components in other configurations to be used.

Figure 2:
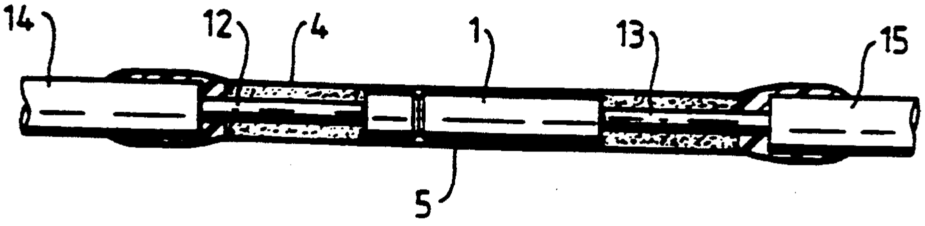
Figure 3:
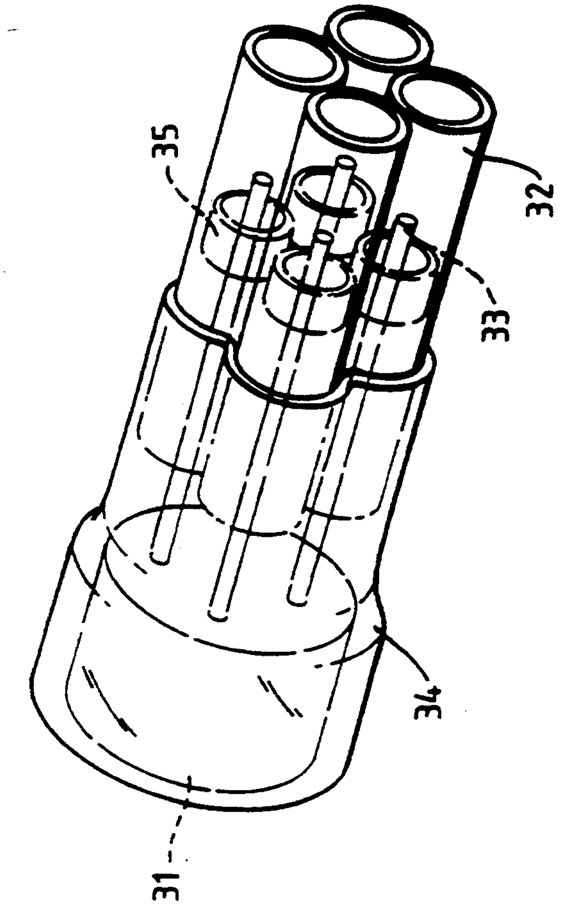

The invention will now be described by way of example with reference to the accompanying drawings in which:

FIG. 1 is a schematic view of a component according to the invention;

FIG. 2 is a schematic view of a component according to the invention after installation; and FIG. 3 is a view of part of a multi-pin connector according to the invention Referring to the accompanying drawings an electrical component which is a resistor has a body 1 and a pair of in-line leads 2 and 3. resistor is enclosed in a dimensionally heat-recoverable sleeve 4 formed from transparent polyvinylidine fluoride that has been cross-linked by exposure to high energy electrons and then expanded in its cross-linked state. The sleeve has a central portion 5 that has been recovered into engagement with the body 1 of the resistor and a pair of end portions 6 and 7 that are in their unrecovered state. Each end portion 6 and 7 contains a ring of pre-fluxed solder 8 and 9 and a ring of uncross-linked polyolefin 10 and 11. The sleeve 4 extends beyond the ends of the terminals 2 and 3.

During installation, a pair of insulated wires comprising conductors 12 and 13 and insulation 14 and 15 that has been stripped off the end of the conductors are inserted into the ends of the sleeve 4 and the end portions 6 and 7 of the sleeve 4 are recovered about the wires by being heated by means of a hot-air gun or infrared lamp, during which the solder rings 8 and 9 fuse to form a solder connection between the leads 2 and 3 and the conductors 12 and 13. During the heating stage the rings 10 and 11 fuse to form a seal against moisture ingress between the sleeve 4 and the insulation 14 and 15 as shown in FIG. 2.

FIG. 3 shows part of a multi-pin component 31, in this case a four-terminal transistor, e.g. a FET with a pair of gates or a bipoplar transistor with a screen. The component is enclosed in a transparent heat-recoverable polyvinylidine fluoride sleeve which comprises four heat-recoverable tubular portions 32, one such portion 32 enclosing each lead 33 of the component, and a further sleeve component 34 of larger diameter, which encloses the body of the component and part of the tubular portions 32. Each tubular portion 32 contains an annular solder insert 35 in its central region so that it encircles one of the leads 33 of the component.

In order to install the component the wires to be connected (which may, for example, be in the form of separate conductors of a multiconductor cable), are simply inserted into the open ends of the tubular portions 32 and the assembly is gently heated by means of a hot-air gun to fuse the solder inserts 35 and recover the tubular portions 32, thereby simultaneously forming insulated solder connections to each of the leads.

We claim:

1. An electrical component that has a plurality of leads extending therefrom, wherein the component is enclosed in an insulating plastics sleeve, and wherein the sleeve has a plurality of dimensionally heat-recoverable end portions that extend over the leads and each end portion encloses a quantity of solder so that each lead can be permanently connected to a conductor by heating the end portions of the sleeve to cause them to recover and the solder to fuse.

2. A component as claimed in claim 1, which has a pair of leads extending therefrom and is enclosed in an insulating plastics sleeve having a pair of heat-recoverable end portions.

3. A component as claimed in claim 1, wherein each end portion of the sleeve includes a quantity of fusible plastics material that will seal the end portions of the sleeve against moisture ingress after recovery.

4. A component as claimed in claim 1, wherein the sleeve is transparent.

5. A component as claimed in claim 1, wherein the sleeve is formed from polyvinylidine fluoride.

6. A component as claimed in claim 1, wherein the sleeve has a central region that has been partially recovered about the body.

7. A component as claimed in claim 1, which is a resistor, diode, a capacitor or a two-lead circuit protection device.

8. A component as claimed in claim 1, wherein the leads extend from one side of the component, the sleeve comprising a plurality of tubular portions each of which encloses a quantity of solder and extends over one of the leads, one end of the tubular portions being retained in a further sleeve that extends over the body of the component.

9. A component as claimed in claim 8, which is a transistor or a multi-contact electrical connector.

* * * * *